(12) United States Patent
Shrivastava et al.

(10) Patent No.: US 7,776,180 B2
(45) Date of Patent: Aug. 17, 2010

(54) PROCESS FOR PREPARING A FLAME RETARDANT AND GLOW RESISTANT ZINC FREE CELLULOSE PRODUCT

(75) Inventors: Aditya Narayan Shrivastava, Nagda (IN); Brij Bhushan Koutu, Nagda (IN); Rajeev Kumar Sharma, Nagda (IN); Daya Ram Chaurasia, Nagda (IN)

(73) Assignee: Birla Research Institute for Applied Sciences, Nagda (IN)

( * ) Notice: Subject to any disclaimer, the term of this patent is extended or adjusted under 35 U.S.C. 154(b) by 0 days.

(21) Appl. No.: 12/504,274

(22) Filed: Jul. 16, 2009

(65) Prior Publication Data

US 2009/0272951 A1 Nov. 5, 2009

Related U.S. Application Data

(62) Division of application No. 11/410,498, filed on Apr. 25, 2006, now Pat. No. 7,651,590.

(30) Foreign Application Priority Data

Mar. 3, 2006 (IN) .................. 305/MUM/2006

(51) Int. Cl.
*D21H 21/14* (2006.01)
*D21H 17/66* (2006.01)
*D21H 17/68* (2006.01)
*C09K 21/02* (2006.01)
*C09K 21/14* (2006.01)
*D06M 11/78* (2006.01)

(52) U.S. Cl. ............... 162/159; 162/160; 162/150; 162/157.6; 162/164.1; 8/137; 8/116.1; 252/607; 252/608; 252/8.63; 252/8.83; 252/8.91

(58) Field of Classification Search .................. 162/159, 162/160; 252/607, 608

See application file for complete search history.

(56) References Cited

U.S. PATENT DOCUMENTS

| | | | |
|---|---|---|---|
| 3,549,308 A * | 12/1970 | Carter ........................ | 8/183 |
| 4,332,601 A | 6/1982 | Wegerhoff et al. | |
| 4,786,017 A | 11/1988 | Wegerhoff et al. | |
| 4,943,349 A | 7/1990 | Gomez | |
| 5,149,400 A | 9/1992 | Haase et al. | |
| 5,277,764 A * | 1/1994 | Johansson et al. ........... | 162/175 |
| 5,417,752 A * | 5/1995 | Paren et al. ............ | 106/166.82 |
| 5,595,630 A | 1/1997 | Moffett | |
| 6,379,501 B1 | 4/2002 | Zhang et al. | |
| 6,576,049 B1 | 6/2003 | Dilts et al. | |
| 6,623,820 B1 | 9/2003 | Nakahara et al. | |
| 6,666,952 B2 | 12/2003 | Dilts et al. | |
| 7,156,955 B2 * | 1/2007 | Nyander et al. ............. | 162/158 |
| 7,504,001 B2 | 3/2009 | Kosuga et al. | |
| 2003/0073024 A1 | 4/2003 | Vanbesien et al. | |
| 2007/0205402 A1* | 9/2007 | Shrivastava et al. ......... | 252/601 |
| 2008/0093767 A1* | 4/2008 | Paren et al. ................. | 264/188 |

FOREIGN PATENT DOCUMENTS

| | | |
|---|---|---|
| GB | 1064271 | 7/1963 |
| JP | 401183596 A | 7/1989 |

* cited by examiner

*Primary Examiner*—Joseph D Anthony
(74) *Attorney, Agent, or Firm*—The Webb Law Firm

(57) ABSTRACT

Provided is a process for the preparation of flame retardant cellulosic product including the steps of adding a soluble salt of silica to viscose, followed by blending and extruding the blended viscose into a spin bath, regenerating the viscose and subjecting the regenerated viscose to a step of glow proofing with polyaluminium compounds to obtain the flame retardant cellulosic product.

10 Claims, No Drawings

PROCESS FOR PREPARING A FLAME RETARDANT AND GLOW RESISTANT ZINC FREE CELLULOSE PRODUCT

CROSS REFERENCE TO RELATED APPLICATIONS

This application is a divisional application of U.S. patent application Ser. No. 11/410,498 filed Apr. 25, 2006 now U.S. Pat. No. 7,651,590, the contents of which are expressly incorporated herein by reference.

FIELD OF THE INVENTION

The present invention relates to flame retardant cellulosic products such as fibre or filaments and a process for its preparation by incorporating a soluble salt of silica in viscose. In particular the invention relates to a silica containing zinc free flame resistant cellulosic product which is also resistant to smouldering and glow.

BACKGROUND OF THE INVENTION

The world demand for inherently flame resistant synthetic fibres has increased sharply over the last few years. This trend is a result of increasing safety awareness of the population specially in highly developed and industrialized countries. Consequently, a number of special process technologies have been developed to produce combustion resistant textile products by finishing or dope additive techniques. In general the flame retardant chemicals are selected from the family of compounds of phosphorous, antimony, sulphur, halogens etc. However, many of these are not eco-friendly due to their hazardous nature.

Sandoz-Switzerland had developed a series of Pyrophosphate compounds for flame resistant additives. Out of these Sandoflam 5060 (2,2-oxybis(5,5-dimethyl-1,3,2-dioxaphosphorinane-2,2-disulphide) was found very suitable to produce flame retardant viscose fibre with a dose of 20% on cellulose. However the cost of this chemical is very high and thus the process becomes highly cost intensive. Moreover the product containing this compound on burning produces toxic gases.

On the other hand, the products containing silicon dioxide are considered out standing in their fire resistant characteristics. Such products are manufactured by number of methods. In some method, silica ($SiO_2$) fibres are prepared by dry spinning method from a water glass solution as described in U.S. Pat. No. 4,786,017 and U.S. Pat. No. 4,332,601. These methods produce the fibres of Silicon-dioxide but do not contain the natural or synthetic polymers like cellulose.

In GB Patent 1064271, wherein sodium silicate is mixed with viscose (cellulose xanthate solution) and regenerated in to cellulose embedded with silicic acid. The fibres manufactured according to this method contained large amount of silica and modified with aluminium compounds like sodium aluminate. These fibres are further given a heat treatment in a muffle to convert it in to porous sintered fibres of $SiO_2$. The cellulosic fibres containing silica, as produced by above method show serious disadvantages when given an alkaline treatment. In alkaline washing treatment the silica content dissolves out and the flame retarding effect gets nullified after some washings.

The method of prior arts for producing silica containing flame retardant fibre is zinc based process and the product contains zinc ions. In a typical commercial product the zinc content was found in the level of 50 ppm. Zinc is a known hazardous and toxic element and in many eco-label products it is restricted. The threshold limit of zinc in M.S.T. (Marke Scadstoffgeprufter Textilien) standard and HELCOM (The Helsinki Convention) for eco-labelling textiles is 5 and 2 ppm respectively. Many Environmental protection agencies like U.S. Environmental Protection Agency (EPA), The Occupational Safety and Health Administration (OSHA), Agency for Toxic Substance and Disease Registry (ATSDR) etc. have reported the ill effect of zinc compounds. Thus the end products made from the fibres/filaments containing zinc are not considered as eco-friendly and therefore unacceptable in some textile usage.

Moreover these products also show after glow behavior i.e. they glow spontaneously without flame.

Another major drawback of sodium aluminate treatment in the manufacturing of said product in above methods is the problem of precipitate and dust as some of the aluminates get precipitated in the form of alumina tri hydrate ($Al_2O_3.3H_2O$) during the application stage which is insoluble in water or alkali. The content of these precipitates increases during the circulation of the solution and a major portion is carried over by the fibre mats. These precipitates adhere on the pressing rollers, thus making the movement of fibre mats difficult. The precipitates carried over by the fibre mats get dried in the dryers and spread as inorganic dust in nearby zone making the working atmosphere inconvenient and unfriendly. The dust problem is also observed in down stream processing of these products.

Therefore the product according to prior art methods suffers from the major drawbacks of having unacceptable levels of zinc, showing after glow behaviour, and generate inorganic dust.

OBJECTS OF THE INVENTION

It is therefore an object of the present invention to provide flame retardant cellulosic product containing silicon compound which has better fire resistant properties than the known compounds.

Another object of the present invention is to provide flame retardant cellulosic product containing silicon compound which does not precipitate out during the treatment and thus making the process/product dust free.

Still another object of this invention is to provide flame retardant cellulosic product containing silicon compound which is eco-friendly.

Yet another object of this invention is to provide flame retardant cellulosic product containing silicon compound which eliminates the use of zinc and sodium aluminate.

DESCRIPTION OF THE INVENTION

Thus according to this invention is provided a flame retardant cellulosic product containing silica, modified with polyaluminium ions.

In accordance with this invention, the viscose preparation is carried out by treating the cellulose pulp with 18-19% sodium hydroxide solution to convert it into alkali-cellulose which is further shredded after removing the excess of alkali. The shredded alkali-cellulose is aged to involve depolymerisation of cellulose molecules to a desired level of 300-350 DP (Degree of polymerisation). Aging is carried out in atmospheric oxygen for a period of 3-5 hours at 40-46° C. The aged alkali-cellulose is then reacted with 30-36% carbon disulphide on cellulose weight basis to form sodium cellulose xanthate. This xanthate is further dissolved in dilute sodium hydroxide solution in a dissolver equipped with stirrers and cooling arrangements for a period of 2-3 hours. The temperature in the dissolver is kept below 20° C. The solution of sodium cellulose xanthate is known as viscose. The viscose composition is maintained as 6-12% cellulose, 5-10% sodium hydroxide, 50-70 seconds of ball fall viscosity (hereinafter described as B.F.).

The alkaline solution of sodium silicate can be added to any stage after completion of dissolution of cellulose xanthate, viz i) In the dissolver after completion of dissolution of sodium cellulose xanthate.
ii) After filtration of viscose.
iii) Prior to spinning at spinning machine by injection method.

However it is preferable to incorporate the sodium silicate solution in the dissolver before filtration and mix well so that the sodium silicate uniformly gets mixed in the viscose. The concentration of sodium silicate solution before mixing in viscose should be in the range of 18-20% as silica. The higher concentration of silicate should be diluted with 10-15% NaOH solution to get 18-20% silica. It is also preferred to filter the sodium silicate solution to remove any impurities or precipitated silica. 18-20% $SiO_2$ in the silicate solution is maintained to keep the viscose viscosity nearly same to that of pure viscose.

The manufacture of flame retardant product begins, as per conditions of present invention, with the blending of alkaline solution of sodium silicate and viscose in proportion to keep the concentration of silicon (Si) to about 7-25% by weight on product, preferably 10-20% by weight, the content of cellulose in pure viscose is about 6-12%, preferably 7-9% and the NaOH concentration is about 5-10% preferably 6-8% by weight. All components measured are as dry weight basis.

Optionally, the viscose composition may contain viscose additives such as condensate product of glycols and amines in the range of 0.1-1.0% on cellulose basis for proper xanthation reaction and ease of filtration.

The composition of blended solution of sodium silicate and viscose (hereinafter described as blended viscose) is in the range of 6-9% cellulose, 6-8% NaOH, 1.5-2% silicon, 2.4-2.8% $CS_2$ and 45-60 second B.F. viscosity. All components are based on blended viscose by weight.

The blended viscose of sodium silicate and viscose is properly filtered, deaerated and ripened. The ripening of blended viscose is an important parameter since the polymeric silica precipitates only when the regeneration of fibre is slow. By extensive experimentation it was found that the ripening index (RI) of above 12° H (Hottenroth Index, by ammonium chloride method) is suitable for a viscose of present invention. The lower RI of viscose shows reduced loading of silica in the fibre indicating that the silica gets dissolved out in the regeneration or washing zones. The ripening index of spinning viscose is maintained between 12-22, preferably 14-18° H. The well ripened viscose is transformed in to a desired products like fibre or filaments by spinning technique. The metered quantity of blended viscose is passed through spinnerets of 50-100 microns hole diameter into an acidic spin bath. The precipitation of cellulose and silicon dioxide takes place in the same manner as normal viscose. A solid polymer of silicon dioxide and cellulose in the form of filament is formed when the blended viscose comes in contact of acidic spin bath. The acidic spin bath contains 105-150 g/l sulphuric acid, preferably 110-140 g/l sulphuric acid, 250-380 g/l sodium sulphate, preferably 300-360 g/l sodium sulphate, 6-20 g/l, preferably 6-12 g/l aluminium sulphate at a temperature of 35-55, preferably 40-50° C. The spin bath is free from any zinc compounds.

The commercially available sodium silicate contains 25-32% $SiO_2$ and the preferable range of molecular ratio of $SiO_2:Na_2O$ is 1.8-2.5 for the present invention. The sodium silicate solution must be therefore diluted to about 18-20% as $SiO_2$ by adding 10-15% sodium hydroxide solution. The diluted sodium silicate solution should be filtered through a cotton cloth/cotton pad or some other suitable filter media. The concentration of 18-20% $SiO_2$ in sodium silicate before adding in viscose is preferable to maintain the viscosity of viscose to its original state.

The spinning is carried out with a spinnerets having 5000-40000 orifices with 50-100 micron hole dia. The immersion depth of spinneret in the spin bath is to be kept 50-60 cm for proper precipitation of silicon dioxide in polymeric form in the fibre matrix.

The coagulated tow from the spin bath is stretched between take up godet and stretching roller to about 40-100% in air, preferably 50-65%. If staple fibres are manufactured the tow is drawn into cutter where they are cut into desired length for example 30-120 mm. The freshly coagulated fibres/filaments are completely regenerated in acidic bath of 5-30 g/l sulphuric acid at 70-100° C. and washed with water.

After this washing stage the treatment of polyaluminium ions as fire proofing/wash fastness agent, according to this invention can be carried out. The polyaluminium ions will then react strongly with the surface of polymeric silica to form a layer of aluminium silicate which is more stable in alkaline and acidic bath and thus retains in the fibre even after repeated washing. Polyaluminium ions may preferably be obtained from polyaluminium chloride (PAC). The treatment can be carried out with a solution of polyaluminium chloride at a concentration of 3-30 g/l as aluminium at a temperature of 20-60° C., preferably 30-50° C. for sufficient time.

Obviously, the treatment of polyaluminium ions can also be carried out at any suitable stage after acidic spin bath, for example at stretching stage or $CS_2$ recovering stage or after desulphurization stage or when the fibre has been further processed.

Subsequently, the testing procedures and the preferred embodiments of the invention are described in more details.

Flammability Assessment Test

Following arbitrary test method was developed at Birla Research Institute to assess the flame retarding characteristics of fibre which gives reproducible result and is a quicker method to measure the combustion characteristics—both flaming and glowing behavior of fibres in the form of rope.

Take 1 gm of dry fibre, open it properly and condition it at 65% RH at 25° C. for 2-4 hours. Make a lea of about 12 inches by hand and twist it sufficiently and make a rope of two ply of 6" length. Hang this rope on a supporting rod in a draft free atmosphere. Take an acetone burner (a burner containing acetone as fuel), adjust the flame to 1" length and apply the flame at the bottom of the rope such that ½" flame is in contact with rope. Apply the flame for 12 second and remove it. Observe the flaming characteristics and measure the initial char length just after extinguishing the flame. Further, observe the glow/smouldering behavior of rope (i.e. burning of rope without flame). Measure the total char length after 5 minutes of glowing. Glow char length is determined by subtracting the initial char length from total char length. Assess the flame retarding character of the fibre as below:—

1) If rope burns easily & flame propagates to entire length — Highly flammable/Low flame resistant
2) If rope burns and gets extinguished after removing the flame, measure the initial char length
   a. If initial char length is 100 ± 30 mm — Moderate flame retardant
   b. If initial char length is 50 ± 20 mm — Good flame retardant
   c. If initial char length is below 30 mm — Excellent flame retardant
3) Glowing or smouldering character is determined by measuring the glow charlength after 5 minutes of extinguishing the flame.
   a. If glow char length is 20-30 mm — Poor glow resistant
   b. If glow char length is 10-20 mm — Moderate glow resistant
   c. If glow char length is 1-10 mm — Good glow resistant
   d. If glow char length is 0-1 mm — Excellent glow resistant The invention is further described in the following examples, however they are not regarded as the limit on the scope of invention.

Example-1

The viscose was prepared in a conventional manner. To a ready viscose, 182 gm of technical grade sodium silicate (water glass containing 20% $SiO_2$) per kg of viscose was added and mixed thoroughly. The blended viscose thus contained 18.7% silicon (Si) on cellulose basis by weight. Before adding the sodium silicate the viscose contained 9.1% cellulose, 5.46% sodium hydroxide and 32.5% $CS_2$ on cellulose basis and had a viscosity of 55 seconds at 20° C. by ball fall method (hereinafter described as BF). After addition of sodium silicate the proportions of contents were 7.7% cellulose, 1.44% Si, 6.7% NaOH and viscosity of 59 BF.

After filtration, deaeration and attaining RI of 14.5° H, the flow of blended viscose (viscose-sodium silicate mixture) was metered for 3 denier fibre and was spun through a spinneret of 65μ hole diameter in the spin bath containing 135 g/l sulphuric acid, 350 g/l sodium sulphate and 8 g/l aluminium sulphate. The temperature of spin bath was 45° C. The spinneret was immersed to the depth of 50 cm in the spin bath. The filaments coagulated in the spin bath were drawn over rollers and stretched between take-up godet and stretching rollers to a length of 57% greater than its original length. The spinning speed was 42 m/min. The tow was then led to a cutter where it was cut in to staple length of 51 mm.

The cut fibres were regenerated completely in an acidic bath of 20 g/l $H_2SO_4$ at temperature of above 90° C. and washed with hot water. After this the fibre mat was treated with different concentration of polyaluminium chloride solution at 40° C. followed by hot water washing. The fibres were further treated with desulf bath containing 0.5-1 g/l NaOH, bleached with sodium hypochlorite and finished with surface active agent in a similar manner as regular rayon.

The another portion of cut fibre was also treated with varying concentration of sodium aluminate solution for comparing the fibre properties.

The dry fibres were analysed for their ash content and textile properties. Ash in the fibre was determined by igniting the fibre at 750° C. for 90 minutes. Ash obtained in this manner was pure silica and when treated with PAC or sodium aluminate, it also contained certain quantities of $Al_2O_3$. The fibre properties are reported in table-1.

TABLE 1

Ash and textile properties of fibres treated with different liquors

| Treatment Liquor | Conc. Of treatment Liquor (g/l) | Temp. °C. | Denier | Cond. Tenacity g/d | Cond. Elongation % | Ash % |
| --- | --- | --- | --- | --- | --- | --- |
| Control | — | — | 3.0 | 1.71 | 18.5 | 26.0 |
| PAC as $Al_2O_3$ | 5 | 40 | 3.1 | 1.65 | 18.3 | 28.5 |
| PAC as $Al_2O_3$ | 10 | 40 | 3.12 | 1.60 | 18.3 | 29.4 |
| PAC as $Al_2O_3$ | 15 | 40 | 3.20 | 1.54 | 18.2 | 30.3 |
| PAC as $Al_2O_3$ | 20 | 40 | 3.30 | 1.50 | 18.3 | 30.8 |
| PAC as $Al_2O_3$ | 30 | 40 | 3.32 | 1.48 | 18.2 | 31.4 |
| PAC as $Al_2O_3$ | 40 | 40 | 3.33 | 1.45 | 18.1 | 32.6 |
| $NaAlO_2$ | 10 | 50 | 3.20 | 1.55 | 18.5 | 26.5 |
| $NaAlO_2$ | 20 | 50 | 3.22 | 1.52 | 18.3 | 28.1 |
| $NaAlO_2$ | 30 | 50 | 3.25 | 1.47 | 18.2 | 31.5 |
| $NaAlO_2$ | 40 | 50 | 3.32 | 1.42 | 18.3 | 33.5 |
| $NaAlO_2$ | 40 | 60 | 3.40 | 1.39 | 18.5 | 35.5 |

The above table shows that the treatment with PAC (polyaluminium chloride) produces similar fibre properties as that of sodium aluminate with marginal lower ash contents. The Table-2 shows the results of flame tests.

TABLE 2

Flame Tests

| Treatment Liquor | Conc. of treatment Liquor (g/l) | Treatment Temp. °C. | Ash % | Flame Resistant | Glow Resistant |
| --- | --- | --- | --- | --- | --- |
| Control | — | — | 26.0 | Moderate | Poor |
| PAC as $Al_2O_3$ | 5 | 40 | 28.5 | Good | Good |
| PAC as $Al_2O_3$ | 10 | 40 | 29.4 | Excellent | Excellent |
| PAC as $Al_2O_3$ | 15 | 40 | 30.3 | Excellent | Excellent |
| PAC as $Al_2O_3$ | 20 | 40 | 30.8 | Excellent | Excellent |
| PAC as $Al_2O_3$ | 30 | 40 | 31.4 | Excellent | Excellent |
| PAC as $Al_2O_3$ | 40 | 40 | 31.6 | Excellent | Excellent |
| $NaAlO_2$ | 10 | 50 | 26.5 | Moderate | Poor |
| $NaAlO_2$ | 20 | 50 | 28.1 | Good | Poor |
| $NaAlO_2$ | 30 | 50 | 31.5 | Good | Moderate |
| $NaAlO_2$ | 40 | 50 | 33.5 | Excellent | Moderate |

PAC = Polyaluminium Chloride
$NaAlO_2$ = Sodium Aluminate

Thus, from the above table it is evident that the use of PAC, even at lower concentration of treatment liquor, the fibre shows excellent flame retarding character as well as excellent glow/smouldering resistance.

Example-2

Viscose was prepared in a manner as described in example-1. 132 gm of commercial grade sodium silicate containing 28% $SiO_2$ was diluted with 53 gm of 10% NaOH solution to get 20% $SiO_2$ in final silicate solution. This solution was filtered and added to 1 kg of ready viscose. Before adding sodium silicate, the viscose composition was 9.25% cellulose, 5.55% NaOH and the viscosity was 60 second BF. After addition of sodium silicate the contents were, cellulose 7.8%, NaOH 7.02%, $SiO_2$ 3.12%, all on viscose weight basis. The viscosity was 59 second BF.

The viscose and sodium silicate containing mixture was filtered, deaerated and ripened to get R.I. of 15° H. Metered amount of blended viscose adjusted for different deniers was passed through spinnerets of 65μ for 1.5 to 3 denier and 90μ for higher deniers to a spin bath containing 130-135 g/l $H_2SO_4$, 8 g/l $Al_2(SO_4)_3$ and 350 g/l $Na_2SO_4$. The temperature of spin bath was 45° C. The tow coming out from the spin bath was led over the godets and stretched in air to 55% between godet and stretching rollers. The spinning speed was 40 m/min. The tow was then cut in to staple length of 51 mm. The cut fibre was treated with 1-2% sulphuric acid at 95° C. for complete regeneration of cellulose. After regeneration the fibre mat was washed with hot water and treated with a solution of 20 g/l polyaluminium chloride (PAC) at 40° C. for attaching polyaluminium ions to silica content of the fibre. The fibre mat was further washed and treated as regular rayon i.e. desulphurising with 1 g/l NaOH, bleached with sodium hypochlorite, finished and dried. This treatment neither produces any dust at dryer or baling stages nor does the solution precipitate at treatment/washing stages. Table-3 shows the properties of fibre produced in example-2.

TABLE 3

Properties of fibre samples

Fibre Properties

| Treatment Liquor as $Al_2O_3$ g/l | Fibre denier | Cond. Tenacity g/d | Cond. Elongation % | Ash % | $Al_2O_3$ % | Flame Resistance Test |
|---|---|---|---|---|---|---|
| PAC, 20 g/l | 1.50 | 1.52 | 18.5 | 30.5 | 4.8 | Excellent |
| PAC, 20 g/l | 3.16 | 1.47 | 20.1 | 31.8 | 5.1 | Excellent |
| PAC, 20 g/l | 4.5 | 1.51 | 21.5 | 32.3 | 5.2 | Excellent |
| PAC, 20 g/l | 6.0 | 1.58 | 24.4 | 33.0 | 5.3 | Excellent |
| PAC, 20 g/l | 6.9 | 1.46 | 24.1 | 33.5 | 5.5 | Excellent |
| PAC, 20 g/l | 8.8 | 1.36 | 22.9 | 33.8 | 5.8 | Excellent |

Example-3

Staple fibres were prepared in the same manner as described in Example-1 by mixing varying amount of sodium silicate in the viscose. The cut fibres were regenerated and treated with 20 g/l solution of polyaluminium chloride (PAC) as $Al_2O_3$ at 40° C. Flame resistant test was carried out and results are presented in Table-4.

TABLE 4

Fibre Properties

Fibre Properties

| Sodium Silicate as $SiO_2$ on cellulose % | Spin-bath Acid g/l | Denier | Cond. Tenacity G/d | Cond. Elongation % | Ash % | Flame Resistant | Glow Resistant |
|---|---|---|---|---|---|---|---|
| 10 | 105 | 3 | 2.45 | 20.5 | 8.3 | Poor | — |
| 20 | 115 | 3 | 2.25 | 20.8 | 17.8 | Good | Moderate |
| 25 | 120 | 3 | 1.88 | 21.2 | 22.2 | Moderate | Excellent |
| 30 | 125 | 3 | 1.75 | 21.6 | 25.7 | Excellent | Excellent |
| 35 | 130 | 3 | 1.63 | 22.5 | 28.1 | Excellent | Excellent |
| 40 | 135 | 3 | 1.55 | 23.0 | 31.2 | Excellent | Excellent |
| 50 | 140 | 3 | 1.37 | 25.5 | 34.5 | Excellent | Excellent |

Example-4

Staple fibres were prepared as described in example-1 and regenerated fibres were treated with varying concentration of fire proofing agent. The fibres were converted into non-woven fabrics of 200 gm/m² and LOI was determined according to standard IS-13501 method. The results are reported in Table-5.

TABLE 5

Limiting Oxygen Index Value

| Treatment Liquor g/l | Ash % | Fibre Quality Den × mm | Grammage g/m² | LOI % |
|---|---|---|---|---|
| 0 (w/o treatment) | 27.0 | 1.5 D × 51 | 200 | 26.7 |
| 0 (w/o treatment) | 26.5 | 3 D × 51 | 200 | 25.7 |
| 10 g/l PAC as $Al_2O_3$ | 29.5 | 3 D × 51 | 200 | 34.5 |
| 20 g/l PAC as $Al_2O_3$ | 31.0 | 3 D × 51 | 200 | 36.6 |
| 30 g/l PAC as $Al_2O_3$ | 31.4 | 3 D × 51 | 200 | 39.2 |
| 40 g/l PAC as $Al_2O_3$ | 32.0 | 3 D × 51 | 200 | 40.0 |

Example-5

Staple fibre of 3 denier×51 mm was prepared in the same manner as described in example-2. The fire proofing was carried out with different compounds of soluble aluminium salts. The ash content and flammability characteristics were evaluated. The results are presented in Table-6.

TABLE 6

Fire proofing trials with different aluminium compounds

| S. No. | Fire Proofing Agents | Conc. of fire proofing agents | Ash % | Flame resistant | Glow resistant |
|---|---|---|---|---|---|
| 1 | Control (Without fire proofed) | — | 27.0 | Moderate | Poor |
| 2 | Aluminium sulphate | 40 | 27.0 | Moderate | Poor |
| 3 | Sodium aluminate | 40 | 33.5 | Excellent | Moderate |
| 4 | Polyaluminium chloride | 40 | 32.5 | Excellent | Excellent |
| 5 | Polyaluminium chloride | 20 | 31.5 | Excellent | Excellent |

Above table shows that the ash content and flame/glow resistant characteristics of non-fire proofed (i.e. control) and that of aluminium sulphate treated fibres are same. The ash content is 27% in both cases. The flame resistant and glow resistant properties are also almost same indicating that aluminium sulphate does not show any fire proofing effect on silica containing fibres.

The ash content of sodium aluminate treated sample is 33.5% and that of PAC treated sample is 32.5%. Although the sodium aluminate treated fibre shows excellent flame retarding character but is inferior in glow resistant properties than PAC. It is clearly evident that PAC is better flame proofing as well as glow-resistant agent than sodium aluminate.

Example-6

Sodium silicate blended viscose was prepared in the same manner as described in example-1 containing 40% $SiO_2$ on cellulose basis. The blended viscose was filtered, deaerated and spun at varying ripening index (R.I.). The regenerated fibre was treated with PAC solution of 20 g/l as fire proofing agent at 40° C. The fibre was further conventionally treated with desulphuring & bleaching bath and finished with lubricating agents. The ash and flame resistant properties were measured and reported in Table-7.

TABLE 7

Effect of spinning R.I. on flame retarding properties of fibre

| Ripening Index ° H | Fire proofing agent (g/l) | Ash % | $Al_2O_3$ % | Flame Resistant | Glow Resistant |
|---|---|---|---|---|---|
| 17.0 | a. Control | 27.0 | Nil | Moderate | Poor |
|  | b. 20 g/l PAC | 32.5 | 5.6 | Excellent | Excellent |
| 15.1 | a. Control | 26.5 | Nil | Moderate | Poor |
|  | b. 20 g/l PAC | 31.5 | 5.0 | Excellent | Excellent |
| 14.5 | a. Control | 26.0 | Nil | Moderate | Poor |
|  | b. 20 g/l PAC | 31.0 | 4.5 | Excellent | Excellent |
| 12.0 | a. Control | 20.5 | Nil | Poor | Poor |
|  | b. 20 g/l PAC | 24.5 | 4.0 | Good | Good |
| 10.5 | a. Control | 16.0 | Nil | Poor | Poor |
|  | b. 20 g/l PAC | 18.1 | 3.5 | Moderate | Moderate |
| 8.0 | a. Control | 12.1 | Nil | Poor | Poor |
|  | b. 20 g/l PAC | 14.1 | 2.8 | Poor | Poor |
| 6.5 | a. Control | 6.0 | Nil | Poor | Poor |
|  | b. 20 g/l PAC | 7.8 | 1.6 | Poor | Poor |

The above table indicates that the polymeric form of silica (which is less soluble in after treatment and washing liquor) is precipitated only at higher R.I. of blended viscose i.e above 120H. At lower RI, a major part of silica is washed out. This is also indicate with ash contest and flame tests. Therefore, the ripening index of blended viscose at the time of spinning is an important parameter of the present invention.

We claim:

1. A process for the preparation of flame retardant cellulosic product comprising the steps of adding a soluble salt of silica to viscose, followed by blending and extruding the blended viscose into a spin bath, regenerating the viscose and subjecting the regenerated viscose to a step of glow proofing with polyaluminium compounds to obtain the flame retardant cellulosic product, wherein the regeneration/spin bath is free from any zinc compounds.

2. The process as claimed in claim 1, wherein the soluble salt of silica is sodium silicate.

3. The process as claimed in claim 1 wherein the regeneration of blended viscose into desired shape is carried out in a spin bath containing 105-150 g/l sulphuric acid, 6-20 g/l aluminium sulphate and 250-380 g/l sodium sulphate.

4. The process as claimed in claim 1, wherein regeneration is effected at a temperature in the range of 35 to 55° C.

5. A process as claimed in claim 1 wherein the step of glow proofing is carried out after regeneration with a solution of polyaluminium compounds containing 3-30 g/l as aluminium at temperature 20-60° C.

6. The process as claimed in claim 1, wherein the polyaluminium ions as flame proofing agent are supplied by polyaluminium chloride.

7. The process as claimed in claim 5, wherein the polyaluminium ions as flame proofing agent are supplied by polyaluminium chloride.

8. The process as claimed in claim 1, further comprising the step of ripening the blended viscose.

9. The process as claimed in claim 8, wherein the regenerated viscose has a ripening index (RI) of at least 12 degree Hottenroth.

10. The process as claimed in claim 9, wherein the regenerated viscose has a ripening index (RI) of between 14 and 18 degree Hottenroth.

\* \* \* \* \*